United States Patent [19]

Mansfield

[11] 3,760,951
[45] Sept. 25, 1973

[54] WATER FILTER CONNECTION MEANS

[76] Inventor: Edward Harry Mansfield, 905 Riverbrook Ct., Tampa, Fla.

[22] Filed: June 21, 1971

[21] Appl. No.: 154,758

[52] U.S. Cl. ............................. 210/449, 210/460
[51] Int. Cl. ............................................. B01d 27/00
[58] Field of Search ................... 55/179; 210/449, 210/460; 285/8, 40

[56] References Cited
UNITED STATES PATENTS

| | | | |
|---|---|---|---|
| 3,074,746 | 1/1963 | Shames et al. | 285/8 |
| 1,059,773 | 4/1913 | Sgambati | 285/8 |
| 633,324 | 9/1899 | Luke | 285/40 |
| 2,582,388 | 1/1952 | Mansfield | 210/266 |
| 1,898,382 | 2/1933 | Mullaney | 210/449 X |

FOREIGN PATENTS OR APPLICATIONS

| | | | |
|---|---|---|---|
| 8,787 | 6/1887 | Great Britain | 285/40 |

*Primary Examiner*—Samih N. Zaharna
*Assistant Examiner*—Richard W. Burks
*Attorney*—Stefan M. Stein

[57] ABSTRACT

A water filter having a connection means for easily and quickly connecting the filter to a water faucet without the necessity of utilizing tools. An adapter screws to the faucet and the water filter is connected to the adapter by a bayonet fitting. Provision is made to connect the water filter at either end so it may easily be reversed for cleaning and flushing.

5 Claims, 5 Drawing Figures

PATENTED SEP 25 1973 3,760,951
FIG. 1 FIG. 2 FIG. 3 FIG. 4 FIG. 5
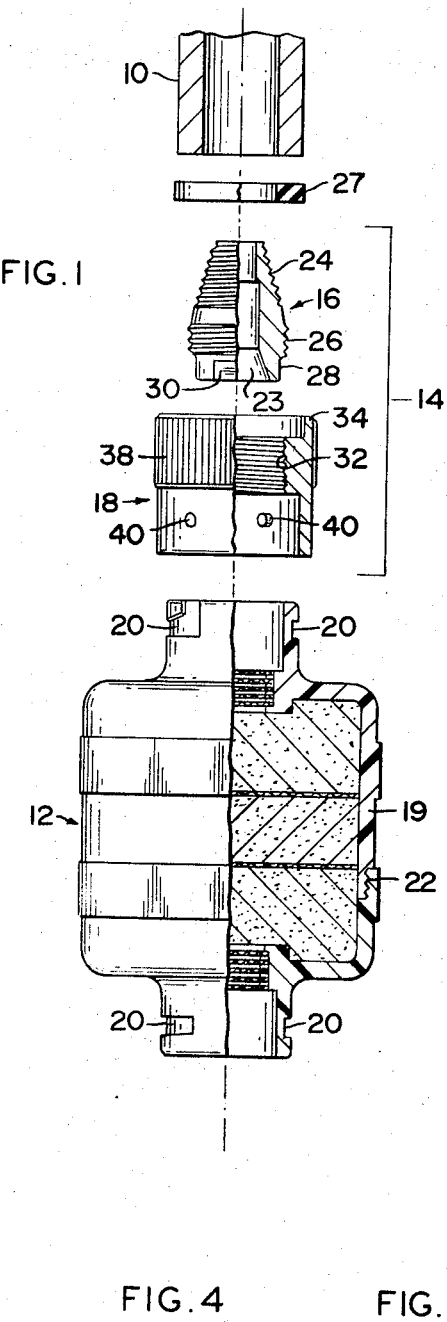
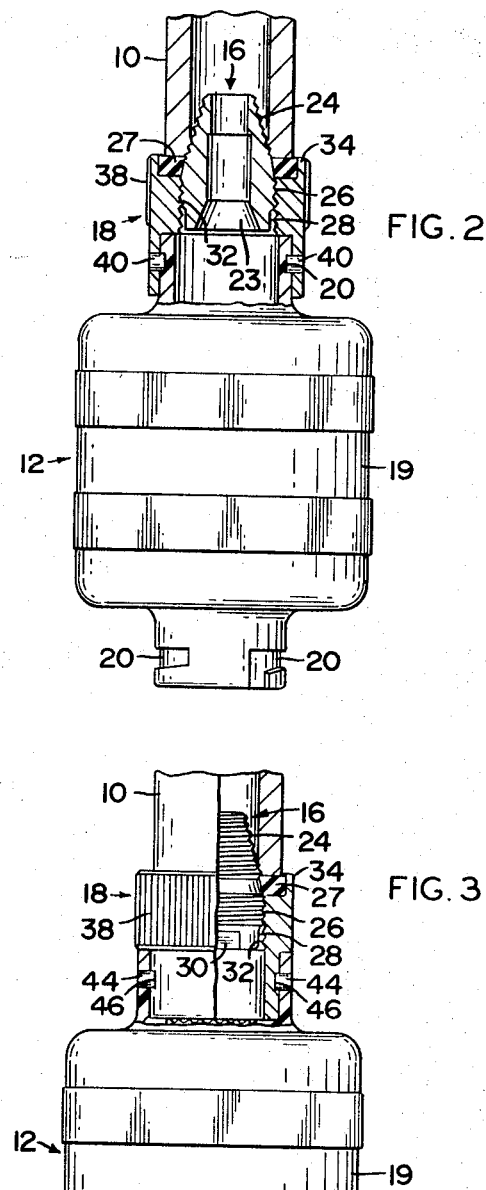
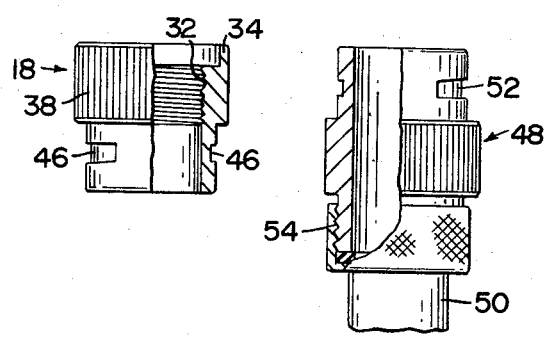
INVENTOR.
E. HARRY MANSFIELD
BY Law Offices of
Stefan M. Stein
ATTORNEY.

WATER FILTER CONNECTION MEANS

This invention relates to an improvement in a water filter of the type designed for domestic use in filtering and clarifying faucet water; more particularly, this invention relates to a means of connecting such a water filter to a water faucet.

In U. S. Pat. No. 2,582,388, a patent which is incorporated by reference into this application, I disclosed my invention of an improved water filter. As indicated in this patent, the water filter is of the type which is to be connected to the water faucet for filtering the water flowing therefrom. To connect the filter to the faucet, an adapter is first attached to the water faucet and the filter is then connected to the adapter. The water filter is provided with threads on each end and is connected by being screwed to the adapter.

Unfortunately, connecting the water filter to the adapter by a threaded connection has proved to be unsatisfactory. One reason is that the screw threads are often damaged by careless handling of a housewife when connecting the filter. After the threads are damaged, the filter is difficult to connect and also the damaged threads provide a leakage path for water. A second reason is that it takes too long to align the threads and then screw the filter to the adapter. The housewife would prefer a quicker connection means. Moreover, forming threads on both the adapter and filter has proved to be a major expense in fabricating the filter. If these threads were eliminated, the filter could be fabricated more economically lowering the cost to the consumer. Finally, an adapter is needed which can easily be attached to a faucet without water leaking between them.

Accordingly, it is an object of this invention to provide means for connecting a water filter to a water faucet whereby the filter may easily and quickly be connected or disconnected from the faucet without the necessity of tools.

Another object is to provide an adapter for adapting a water faucet to receive a water filter wherein the adapter is simply constructed, easily attached, and economical to manufacture.

Still another object is to provide a water filter which can be easily connected to a faucet at either end so the filter may be reversed for cleaning and flushing.

A further object is to provide a water filter and a faucet connection means which are both practical and economically feasible to manufacture.

Other objects of the invention will in part be obvious and will in part appear hereinafter.

In accordance with these objects, the invention comprises a connection means for connecting a water filter as shown in U. S. Pat. No. 2,582,388 to a water faucet. The connection means comprises an adapter having one end formed to be attached to the faucet and the other end formed with one portion of a bayonet fitting. The water filter itself is formed at each end with the mating portion of the bayonet fitting for attaching the filter at either end to the adapter.

The adapter comprises of a bushing and a sleeve. The bushing, having a water receiving opening extending therethrough, has on its upper end a threaded substantially cone shaped member which is screwed to the inside of the faucet. The lower end of the cone member terminates into a threaded cylindrical section upon which the sleeve is screwed. Defining the bushing as as substantially coned shaped in the context of the present invention is meant to include a frusto conical configuration wherein the upper portion of the bushing, as shown in the drawings of this invention, is substantially inwardly tapered. The sleeve is screwed upwardly until it abuts and seals the open end of the faucet. The bottom portion of the sleeve is formed with the bayonet fitting.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a partial cross-sectional view of the components in the invention arranged to be connected to a water faucet.

FIG. 2 is a partial cross-sectional view showing the components of FIG. 1 assembled and connected to a water faucet.

FIG. 3 is a partial cross-sectional view of a modification of the invention wherein the male portion of a bayonet fitting is formed on the ends of the water filter.

FIG. 4 is a partial cross-sectional view of the sleeve shown in FIG. 3.

FIG. 5 is an elevation view of an attachment for connecting the filter to a hose.

Similar reference characters refer to similar parts throughout the several views of the drawing.

Referring now to the drawings in detail, there is illustrated in FIG. 1 the primary elements of the invention arranged in a sequence to be attached to a water faucet 10. FIG. 2 shows these elements in an assembled relationship. The elements generally comprise a filter 12 and an adapter consisting of a bushing 16 and a sleeve 18.

Filter 12 is essentially the filter shown in U. S. Pat. No. 2,582,388 with the exception that its body 19 is preferably made out of molded plastic and each end of the filter is formed with a female portion 20 of a conventional bayonet fitting instead of the screw threads. The two parts of the filter body are screwed together with a left handed thread 22.

The adapter adapts the water faucet to receive water filter 12. It consists of a bushing 16 for attachment to the faucet and a sleeve 18 for sealing the faucet and for connecting the adapter to the filter.

The bushing 16 is preferably made of metal. It has a water receiving opening 23 extending axially therethrough and is formed at its upper end with a threaded cone 24 adapted to be screwed into the interior of faucet 10. Advantageously, the conical shape enables the bushing to be screwed into faucets having openings of different diameters or of different configurations, i.e., hexagonal, square, round, etc. As the cone is screwed inwardly, its threads cut into the faucet and thereby securely retain the bushing. For engagement with sleeve 18 the base of the cone terminates in a cylindrical section 26. A smooth cylindrical section 28 flattened with opposite flats 30 for receiving a tool such as a wrench is provided below cylindrical section 26. This allows the bushing to be easily rotated by a wrench in screwing the bushing's upper cone 26 into the faucet.

An annular rubber gasket 27 fits over the end of cone 24 for sealing the opening of faucet 10.

Sleeve 18 is generally annular and is threaded on its interior 32 with threads to mesh with the threads on the threaded cylindrical portion 26 of bushing 16. Although the sleeve may also be made of metal, it is preferably made of plastics such as acrylonitrile-butadienestyrene (ABS), the acetates, the acrylics, cellulose acetate, cellulose propionate, acetate butyrate, eopxy resin, the fluoroplastics, melamine-formaldehyde, nylon, phenolformaldehyde, phenol-furfural, polycarbonate, the alkyds, polyethylene, polypropylene, polystyrene, vinyl polymers and copolymers and ABS-modified polyvinyl chloride and injection molded making it more economical to produce. The upper end of the sleeve contains an annular wall 34 for housing gasket 27. Finger knurls 38 are provided on the outside surface of the upper end of the sleeve for facilitating the rotation of the sleeve by hand in screwing the sleeve on bushing 16. The lower end of sleeve 18 is formed with a male portion of a conventional bayonet fitting which mates with the female portion of the bayonet fitting 20 on water filter 12. As is customary, the male portion of the bayonet fitting comprises a pair of pins 40 projecting into the sleeve's interior for insertion into the recess of the female portion 20 on the water filter 12. Although pins 40 are preferably molded of plastic and integral with the sleeve 18, the pins may also be made of metal and appropriately inserted into the sleeve.

In attaching the adapter to the faucet, cone 24 of bushing 16 is screwed into the faucet by rotating the bushing with a wrench. As stated, flats 32 provide a flat surface for enabling the wrench to effectively grip the bushing. After the bushing is firmly attached to the faucet, sleeve 18 is screwed on the bushing 16 and manually rotated until seal 27 is abutted against the lower end of faucet 10. The adapter is then ready to receive the water filter.

The water filter may easily be connected to the adapter by the provision of the bayonet fitting. As is customary in connecting a bayonet fitting, pins 42 are inserted into the recesses of the female portion 20. Afterwards the water filter is rotated slightly to firmly lock the portions together. When thus connected, water will flow from the faucet through the filter without any leakage above the filter's outlet.

Since the female portion of the bayonet fitting 20 is provided on both ends of the filter, it can easily be reversed when it is desired to flush the filter.

FIGS. 3 and 4 show a modification. In this modification, a male portion 44 of a bayonet fitting is provided on each end of the water filter in lieu of the female portion. Similarly, a female portion 46 of a bayonet fitting is provided on sleeve 18 instead of the male portion. This modification is preferred over the embodiment shown in FIGS. 1 and 2 because the lower portion of sleeve 18 can be made with a smaller diameter making it more economical to manufacture. Other aspects of the filter and connecting means are the same.

FIG. 5 shows an attachment 48 for connecting the filter to a conventional hose 50. With this attachment, the water may be filtered prior to being delivered to a washing machine, photographic apparatus, etc. The attachment has a female portion 52 of a bayonet fitting on its upper end for connection to the bottom of the filter shown in FIGS. 3 and 4 and has screw threads 54 at its lower end for connection to the hose.

It should now be evident from the above description that a means for quickly and easily connecting a water filter to a water faucet has been provided. The adapter conveniently adapts the water faucet to receive the water filter. Thereafter, the water filter may be connected to the adapter without the necessity of utilizing tools. Provision of the bayonet fitting enables a housewife to easily and quickly make the correction. Being the bayonet fitting is provided on each end of the filter, the filter may also be easily reversed when flushing of the filter is desired. The elements of the connection means are extremely simple and are practical and economically feasible to manufacture.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A connection means for a water filter of the type that filters water flowing from a water faucet, said filter comprising: a housing, an adapter for adapting a water faucet to connect said housing thereto, said adapter including a one piece bushing and a sleeve, said bushing comprising a water receiving opening extending therethrough and a faucet attachment means, said faucet attachment means comprising the upper portion of said bushing including a substantially frustoconical configuration being tapered inwardly toward its upper end, thread means formed on the exterior surface of said frustoconical portion and disposed to frictionally engage the inner surface of the water faucet to which it is attached, an externally threaded cylindrical section defined by the lower portion of said bushing; said sleeve having at its upper end a sealing means for sealing the end of said faucet and at its lower end a first portion of a bayonet fitting, the interior of said sleeve being threaded to mesh with a threaded cylindrical section on said bushing, said housing including a second portion of a bayonet fitting formed on each of its opposite ends, each of said second bayonet portions configured to mate with said first bayonet portion, whereby said filter is connected or disconnected from said adapter by cooperation of a first and a second bayonet fitting portion.

2. A connecting means as in claim 1 further comprising a rotatable means disposed on said bushing for enabling said bushing to be firmly gripped and rotated with a wrench.

3. A connection means as in claim 1 wherein the first portion of the bayonet fitting on the sleeve is a female portion and each of the second portions of the bayonet fitting on the housing is a mating male portion.

4. The connection means of claim 1 wherein the first portion of the bayonet fitting on said sleeve is a male portion and each of the second portions of the bayonet fitting on the housing is a mating female portion.

5. The filter and connector of claim 1 wherein said filter housing comprises a plastic shell provided with a tubular neck at each of the opposite ends communicating with the interior of the shell and formed with a shoulder at the interior adjacent the juncture of the neck and body of the shell, a screening unit comprising a series of screens and a perforated plate arranged in each neck and seated on the shoulder at the inner end of each tubular neck, gaskets in each unit interposed between the several screens and plate thereof spacing the same appreciable distances apart, means for maintaining the unit in each neck and the component parts of the unit in assembled relation, the mesh of the screens in each unit varying from fine at the inner end adjacent the shoulder to coarse intermediate the ends and thence to fine at the outer end with the perforated plate being positioned intermediate the ends of the unit, and purifying and deodorizing material dispersed in the shell between said necks, consisting of layers of activated carbon and silica, the layer of silica disposed between the layers of activated carbon, and screens separating the layers.

* * * * *